Oct. 6, 1970

R. P. CRANDALL ET AL 3,532,292

MAGAZINE INTERLOCK MECHANISM

Filed May 20, 1968

ROBERT P. CRANDALL
RONALD A. PHILLIPS
INVENTORS

BY

ATTORNEYS

ROBERT P. CRANDALL
RONALD A. PHILLIPS
INVENTORS

BY *R. Lewis Gable*

*Robert W. Hampton*

ATTORNEYS

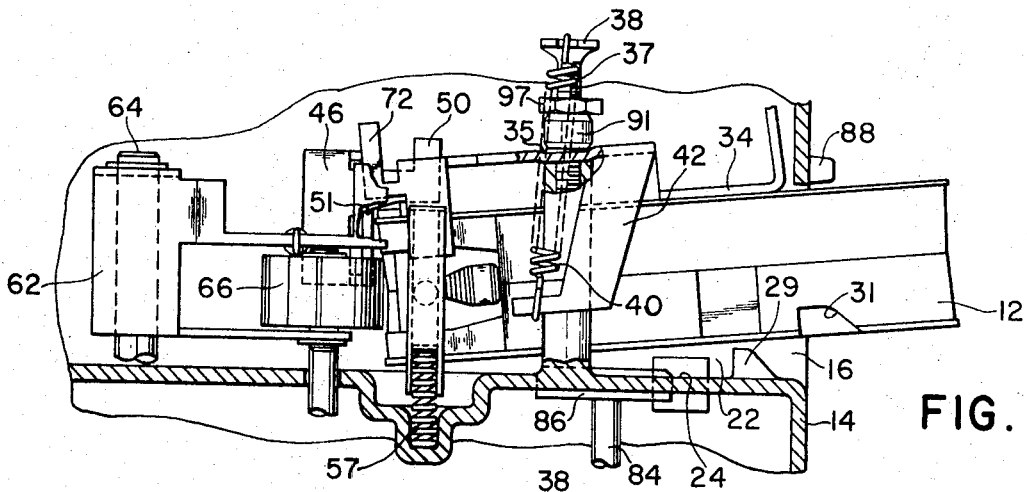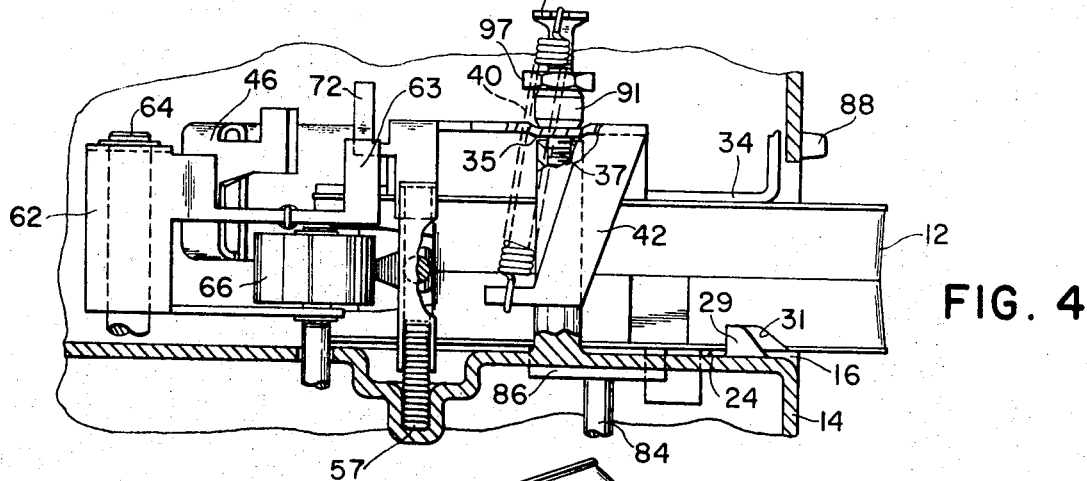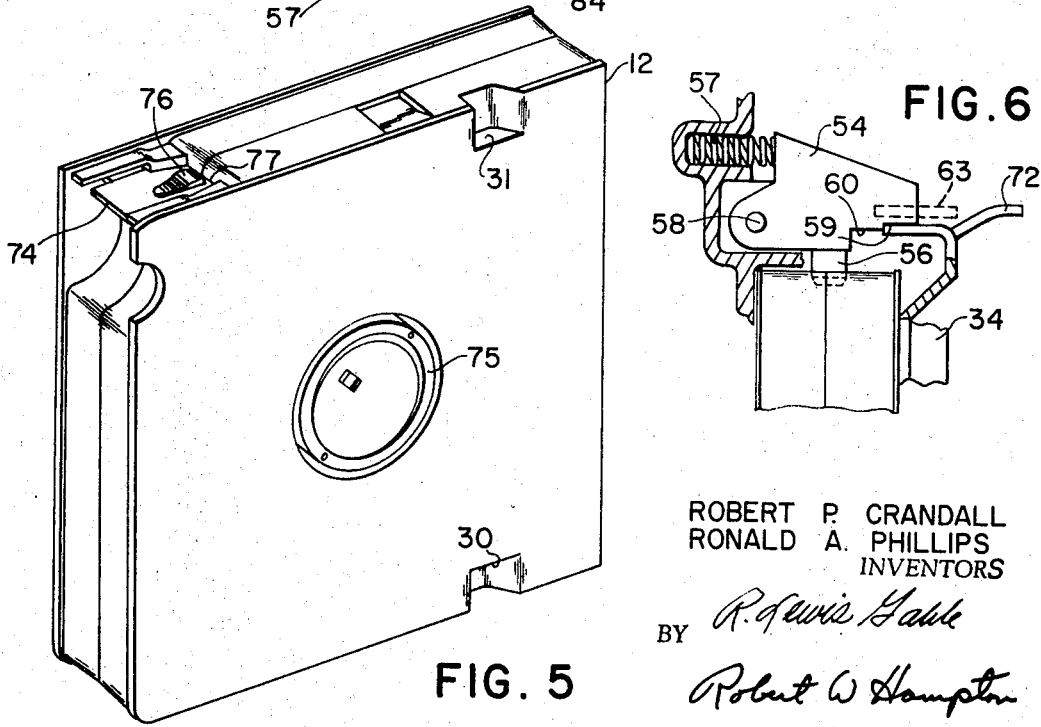

United States Patent Office 3,532,292
Patented Oct. 6, 1970

3,532,292
MAGAZINE INTERLOCK MECHANISM
Robert P. Crandall and Ronald A. Phillips, Rochester, N.Y., assignors to Eastman Kodak Company, Rochester, N.Y., a corporation of New Jersey
Filed May 20, 1968, Ser. No. 730,431
Int. Cl. G03b 1/04; G11b 15/32, 23/04
U.S. Cl. 242—198                    12 Claims

ABSTRACT OF THE DISCLOSURE

This disclosure relates to an interlock mechanism adapted for use in a cavity to align a magazine having a strip wound therein in the cavity and to secure the magazine in the cavity by an appropriate detent within the cavity when a portion of the strip is payed out from the magazine. The interlock mechanism includes in one illustrative embodiment a pivotably mounted cam plate for disposing the magazine in a locked position with respect to the detent and a magazine interlock having an abutting portion or knob. The strip stored within the magazine has a stop which is designed to engage the knob when the strip is rewound within the magazine. Further, the magazine interlock engages the cam plate so as to secure the magazine within the cavity when the strip has been withdrawn from the magazine and to release the cam plate when the strip is rewound within the magazine.

CROSS-REFERENCES TO RELATED APPLICATIONS

Reference is made to commonly assigned copending U.S. patent application, Ser. No. 730,252, entitled "Strip Handling System," filed May 20, 1968, in the names of Robert P. Crandall and Ronald A. Phillips.

BACKGROUND OF THE INVENTION

Field of the invention

This invention relates to magazine interlock mechanisms for use in photographic apparatus and, more particularly, to such interlock mechanisms for ensuring the proper placement of a magazine in a magazine receiving cavity of the apparatus and also for preventing the removal of the magazine therefrom except when a filmstrip is fully rewound within the magazine.

Description of the prior art

The magazine interlock mechanism of the present invention is particularly suitable for use with a microfilm reader adapted to receive a magazine for storing a filmstrip on which microfilm images are carried. However, the magazine interlock mechanism of the present invention could be utilized with other apparatus such as, for example, cameras and filmstrip projectors. The magazine to be used with the magazine interlock mechanism of this invention may take the form of a substantially square box containing a single core upon which the filmstrip is attached and wound. An aperture in the side of the magazine permits the core to be engaged and rotated by suitable drive means incorporated within the microfilm reader. Further, the microfilm reader may include means for engaging and withdrawing the filmstrip from the magazine. With a microfilm reader of this type, it is desirable to provide a system of interlock which firstly, assures the proper alignment of the magazine in the magazine receiving cavity. Secondly, such an interlock mechanism should prevent the filmstrip wound within the magazine from being withdrawn from the magazine unless the magazine is properly positioned in the magazine receiving cavity. Thirdly, the magazine interlock should prevent the removal of the magazine from the magazine receiving cavity when any of the payed-out filmstrip remains in the reader and has not been returned into the magazine.

In U.S. Pat. No. 2,912,899 of Wangerin et al., there is described a magazine interlock mechanism including a series of microswitches which are actuated during the insertion of the magazine into the magazine receiving cavity. In this apparatus, a solenoid is actuated by the microswitches to align a locking detent with respect to the magazine and to move a locking bar into position over the magazine to prevent removal of the magazine. The interlock mechanism of the above-identified patent depends upon the action of a plurality of switches and a solenoid to position the locking bar and the locking detent, and to engage and withdraw the pressure roller from the end of the filmstrip. It may be understood that these components and their related circuitry are more complex than a mechanical interlock system. In addition, the film readers into which such magazine interlock mechanisms may be incorporated are sometimes used in study or library surroundings, where the elimination of noise from a solenoid might be desirable.

SUMMARY OF THE INVENTION

It is therefore an object of thtis invention to provide a mechanical interlock mechanism which prevents removal of a strip-containing magazine from a feeding device while the strip is withdrawn from the magazine.

It is another object of the present invention to provide an improved magazine interlock mechanism to prevent the withdrawal of the filmstrip from the magazine unless the magazine is properly positioned within the cavity and to prevent the withdrawal of the magazine unless all the filmstrip is wound within the magazine.

A further object of the present invention is to provide a new and improved magazine interlock mechanism which is quiet in operation and avoids the use of solenoids.

In accordance with the teachings of this invention, the above and additional objects are accomplished by a magazine interlock mechanism including a magazine receiving cavity with at least one detent for mating with a notch in the outer magazine surface, a cam plate mounted to allow the magazine to be inserted within the magazine receiving cavity and for locking the magazine within the magazine receiving cavity, and an interlock having a first portion thereof for engaging a button or stop associated with the end of the filmstrip wound within the magazine and a second portion for locking the cam plate in a closed position when the first portion is disengaged from the button. Further, there may be provided suitable means such as a pressure roller for disposing the leading end of a filmstrip against a capstan drive to thereby withdraw the filmstrip from the magazine. The cam plate may also include a cam portion illustratively taking the form of a finger for lifting the pressure roller from the filmstrip when the cam plate is disposed in an open position thereby allowing the magazine and the leading end of the filmstrip to be easily inserted within the magazine receiving cavity. The cam plate is disposed in its closed position to thereby lock the magazine within the magazine receiving cavity and to allow the pressure roller to press the leading end of the filmstrip to the capstan drive. The magazine interlock mechanism of this invention may further include a locking plate for holding the cam plate in an open position until the magazine has been inserted within the magazine receiving cavity at which time the locking plate allows the cam plate to assume its locked or closed position.

BRIEF DESCRIPTION OF THE DRAWINGS

These and other objects and features of the present invention will become apparent when considered in view of the following description and drawings in which:

FIGS. 3 and 4 are plan views of the interlock mechanism of FIGS. 1 and 2, respectively, with the magazine disposed in an unlocked position and in a locked position within the interlock mechanism;

FIG. 5 is an orthogonal view of a magazine to be inserted within the interlock mechanism of FIGS. 1 and 2;

FIG. 6 is a detailed view of the interlock mechanism of FIG. 1 with the magazine lock held in a locked position by the cam plate;

DESCRIPTION OF THE PREFERRED EMBODIMENTS

Figure 1:
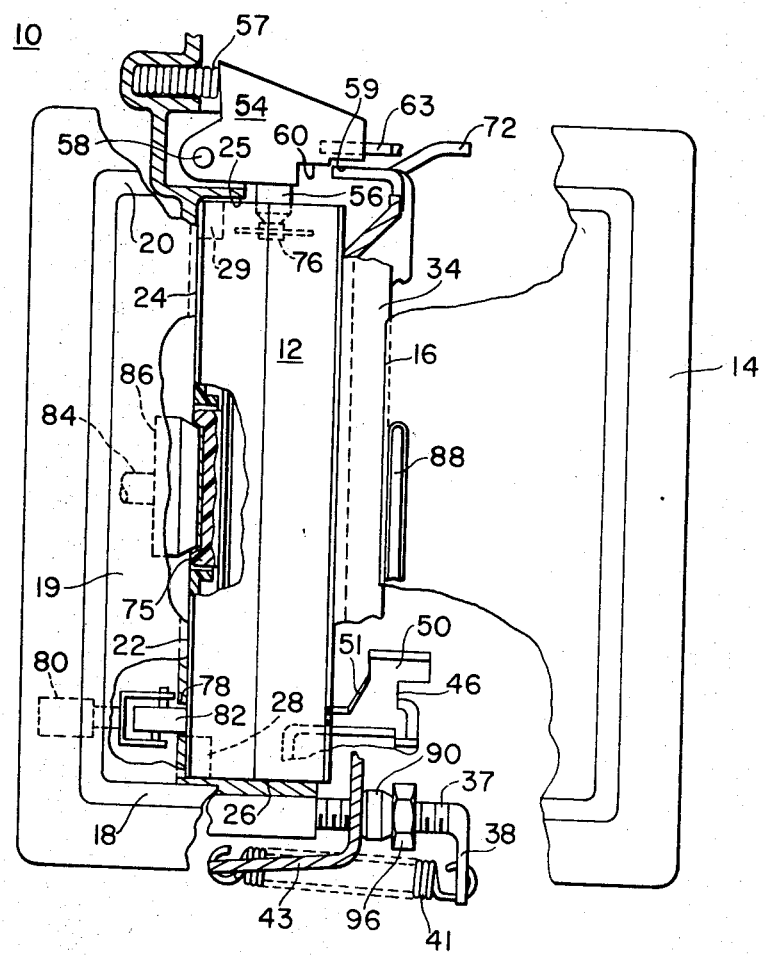
FIG. 1 is a front view, partially broken away, of a magazine interlock mechanism in accordance with the teachings of this invention.
Figure 2:
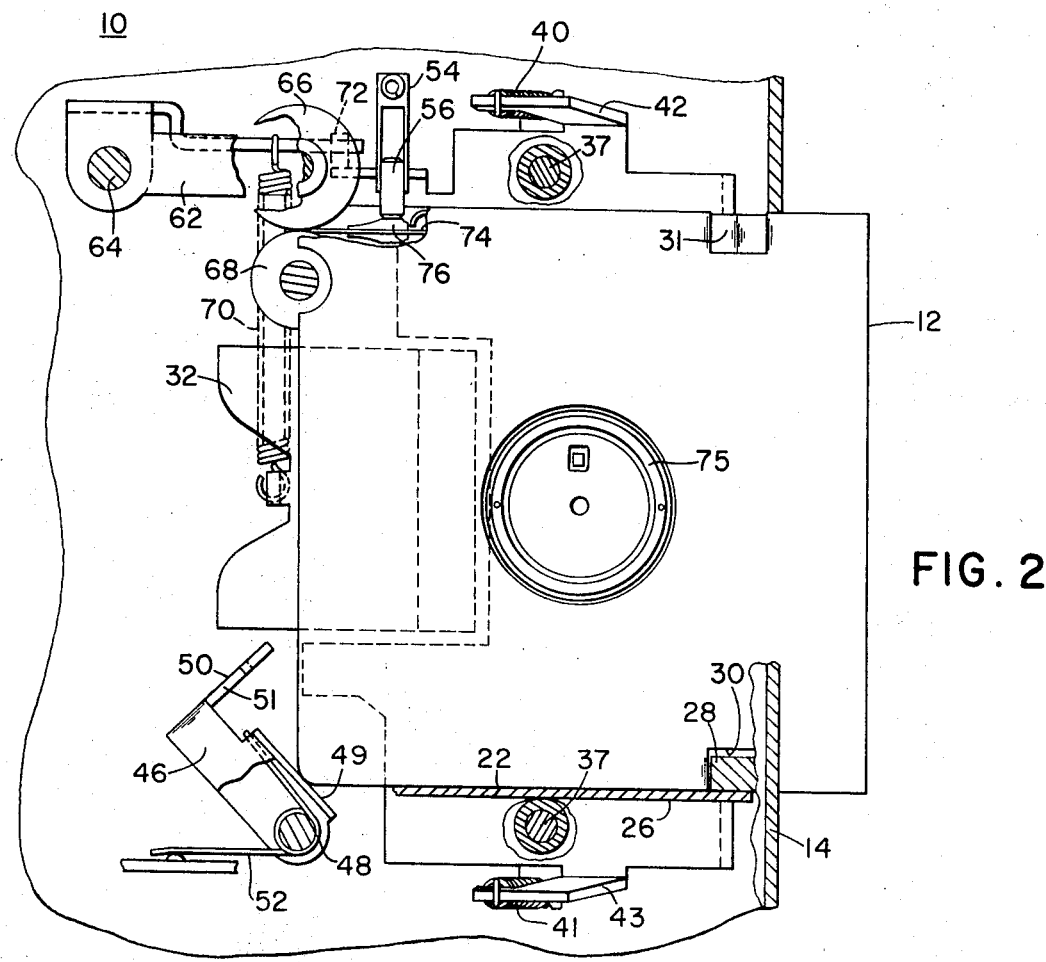
FIG. 2 is a side view of the magazine interlock mechanism of FIG. 1.

With reference to the drawings and in particular to FIGS. 1 and 2, there is shown a magazine interlock mechanism 10 including a magazine receiving cavity 22 in which there is inserted a magazine 12. As shown in FIG. 5, the magazine 12 has a filmstrip 74 wound about a core 75 within the magazine 12 and a leading portion extending from from an aperture 77 of the magazine 12. The leading end portion of the filmstrip 74 has a stop or indicating portion 76 which interacts with the magazine interlock mechanism 10 of this invention. As explained above, the magazine interlock mechanism 10 of this invention may be used in conjunction with a film reader having a face plate 14 as shown in FIG. 1. The face plate 14 has an opening 16 through which the magazine 12 is inserted into the magazine receiving cavity 22. The opening 16 is surrounded by a plurality of flared walls 18, 19 and 20 to facilitate the insertion of a magazine 12 through the opening 16. The magazine receiving cavity 22 includes a side wall 24, a top wall 25 and a bottom wall 26 which serve to accurately position the magazine 12 within the interlock mechanism 10. The side wall 24 has a pair of detents 28 and 29 extending from the surface of the wall 24. When the magazine 12 is properly positioned within the magazine receiving cavity 22, the detents 28 and 29 are aligned with and may be inserted within a corresponding pair of notches 30 and 31 within the magazine 12 (see FIG. 5). A guide plate 32 is further provided for positioning the magazine 12 as it is inserted within the magazine receiving cavity 22.

In accordance with the teachings of this invention, the magazine interlock mechanism 10 includes a cam plate or locking member 34, which is pivotably mounted as shown in FIGS. 1, 2, 3 and 4 upon a pair of threaded posts 37. The posts 37 extend through and are seated within an aligned pair of openings 35 through the cam plate 34. One end of the posts 37 is affixed normally to the side wall 24. The cam plate 34 is resiliently biased by a pair of springs 40 and 41 towards the wall 24 to secure the magazine within the cavity 22. One end of the springs 40 and 41 are connected respectively to a pair of brackets 42 and 43, which are integral with and extend at an angle slightly less than normal from the cam plate 34. The other ends of the springs 40 and 41 are connected as shown in FIGS. 1, 3 and 4 to a pair of arms 38 extending from the posts 37. The posts 37 are received in threaded openings within the wall 24 and are adjustable to increase or decrease both the load against a pair of bearings 90 and 91 and the rotational force applied to the cam plate 34. The bearings 90 and 91 are disposed about and held upon the posts 37 by a pair of nuts 96 and 97 threadably received by the posts 37. The cam plate 34 is spring loaded by the springs 40 and 41 against the bearings 90 and 91, which are seated within the recessed openings 35. Further, the cam plate 34 rotates about the bearings 90 and 91, which in turn are allowed to rotate within the recessed openings 35.

As shown in FIGS. 2, 3 and 4, a locking plate or member 46 is provided for holding the cam plate 34 in an open position so that the magazine 12 may be inserted within the magazine receiving cavity 22 over the detents 28 and 29. An adjustable, pivot screw 48 is disposed through one end of the locking plate 46 for pivotably mounting the locking plate 46. The locking plate 46 is flexibly biased by a spring 52 in a clockwise direction as shown in FIG. 2 against the cam plate 34. One end of the spring 52 may abut against a portion of the film reader housing. The locking plate 46 includes a flange 50 extending at right angles from the plate 46 and including a locking edge 51 for engaging and locking as shown in FIG. 3 the cam plate 34 is in an open position. The adjustable pivot screw 48 allows the proper positioning of the locking plate 46 thereby assuring that the magazine cam plate 34 will always be locked open upon the withdrawal of the magazine 12 from the magazine receiving cavity 22. As the magazine 12 is inserted into the magazine receiving cavity 22, the lower front quarter of the magazine 12 engages an abutting surface 49 of the locking plate 46 to thereby rotate the plate 46 in a counterclockwise direction (as shown in FIG. 2). As the locking plate 46 is rotated, the cam plate 34 is released and is spring biased so as to press the magazine 12 into a locked position over the detents 28 and 29.

Figure 7:
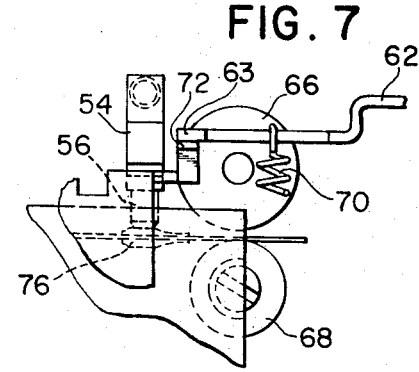
FIG. 7 is a detailed view of the interlock mechanism of FIG. 2 with the stop attached to the strip of film in engagement with the magazine lock.

When the magazine 12 is inserted into the magazine receiving cavity 22 so as to abut with the side wall 24, the magazine 12 closes a switch 80. The switch 80 is connected to a roller 82 which is inserted as shown in FIG. 1 through an opening 78 within the side wall 24 to engage a side of the magazine 12. In turn, the closed switch 80 allows a drive motor (not shown) to be actuated for rotating the core 75 of the magazine 12. In addition, the switch 80 may be used to turn on a projection lamp, a fan for cooling the projection lamp and another fan for cooling the filmstrip 74. The same motor may also rotate a drive shaft 84 and a magnetic chuck 86 connected thereto. As more fully described in copending application Ser. No. 730,252, filed May 20, 1968 entitled "Strip Handling System," by Robert P. Crandall and Ronald A. Phillips, and assigned to the assignee of this invention, the motor may serve not only to drive the core 75 of the magazine 12 but also to drive a capstan roller 68 (see FIG. 2). As explained in the above-identified copending application, the motor may be operated in either direction to pay out the filmstrip 74 and to rewind the filmstrip 74 into the magazine 12. In accordance with the teachings of this invention, the magazine 12 may not be withdrawn from the magazine receiving cavity 22 unless substantially all of the filmstrip 74 has been rewound within the magazine 12. The magazine interlock mechanism 10 of this invention includes a magazine lock (as shown in FIGS. 1, 6, 7) or interlock member 54 which engages the cam plate 34 to prevent the removal of the magazine 12 when a portion of the filmstrip 74 is payed out. The magazine lock 54 includes an abutting portion or knob 56 which engages the stop 76 when all of the filmstrip 74 is rewound within the magazine 12. As more clearly shown in FIGS. 1 and 6, the magazine lock 54 is rotatably mounted about a pin 58 and is flexibly biased by a spring 57 in a clockwise direction. When the knob 56 abuts the stop 76, the magazine lock 54 is lifted slightly upward so as to release the cam plate as shown in FIG. 1. More specifically, the magazine lock 54 has a plurality of stepped edges 59 and 60 which engage the cam plate 34 thereby preventing the cam plate 34 from being rotated to an open position. More specifically, when the filmstrip 74 is payed out and the knob 56 is disengaged from the stop 76, the stepped edges 59 and 60 engage and therefore lock the cam plate 34 as shown in FIG. 6. On the other hand, when the entire filmstrip 74 is rewound within the magazine 12, the stop 76 abuts the knob 56 thereby lifting the magazine lock 54 and disengaging the edges 59 and 60 from the cam plate 34.

As more clearly shown in FIGS. 2 and 7, a pressure roller 66 is rotatably mounted upon a roller bracket 62, which is in turn pivotally mounted at one end by a screw 64. The screw 64 may be inserted within a portion of the film reader housing (not shown). As will be explained in greater detail later, the pressure roller 66 serves to press the filmstrip 74 against the capstan roller 68 to extract or rewind the filmstrip 74 to or from the magazine 12. As shown in FIG. 2, a spring 70 is interconnected between the roller bracket 62 and the guide plate 32 to thereby bias the pressure roller 66 into engagement with the filmstrip 74. In order to allow the magazine 12 to be inserted within the magazine receiving cavity 22 and the leading end of the filmstrip 74 to be inserted between the pressure roller 66 and the capstan roller 68, the pressure roller 66 is withdrawn from the capstan roller 68 (i.e., rotated counterclockwise as shown in FIG. 2 and rotated clockwise in FIG. 7). In order to accomplish this action, a finger 72 (see FIGS. 1, 2, 4 and 6) extends from the cam plate 34 to engage an extending portion 63 of the roller bracket 62. As more clearly shown in FIGS. 1 and 6, when the cam plate 34 is in a closed position to thereby secure the magazine 12 within the magazine receiving cavity 22, the finger 72 is withdrawn from the extended portion 63 to thereby allow the pressure roller 66 to be drawn into contact with the filmstrip 74. When the cam plate 34 is disposed in its open position as shown in FIG. 7, a cam surface of the finger 72 is brought into engagement with the portion 63 to lift the roller bracket 62 and the pressure roller 66. The filmstrip 74 may now be easily withdrawn or inserted between the pressure roller 66 and the capstan roller 68.

Figure 8:
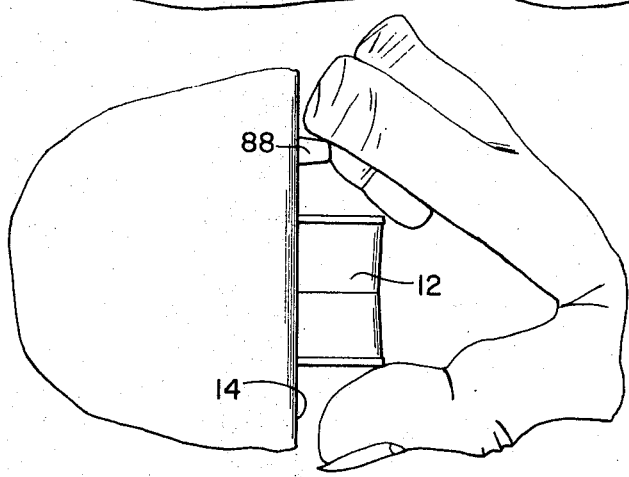
FIG. 8 is an enlarged side view of how an operator disengages the magazine from the interlock mechanism of FIGS. 1 and 2.

In order to withdraw the magazine 12 from the cavity 22, the operator will grip (as shown in FIG. 8) that portion of the magazine 12 extending beyond the face plate 14 and a grip rib 88 and press the two members together. The grip rib 88 extends at approximately right angles from the face plate 14. By pressing the magazine 12 towards the grip rib 88, the engagement (see FIG. 1) between the magnetic chuck 86 and the core 75 of the magazine 12 is broken, and in addition, the cam plate 34 is disposed in its open position so that the magazine 12 may be withdrawn.

OPERATION OF PREFERRED EMBODIMENT

Before the magazine 12 is inserted within the magazine receiving cavity 22, the cam plate 34 is disposed and held in its open position by locking plate 46. Further, the finger 72 of the cam plate 34 engages the extended portion 63 to thereby withdraw the roller bracket 62 and the pressure roller 66 from the capstan roller 68. The magazine 12 may be inserted through the opening 16 within the face plate 14 and into the cavity 22. The magazine 12 slides over the detents 28 and 29 and is further guided by the cam plate 34 and the guide plate 32 to its nested position. As the magazine 12 approaches its nest position, its lower edge engages the abutting surface 49 of the locking plate 46 to thereby release the cam plate 34. The magazine 12 is slid further into the cavity 22 until the notches 30 and 31 of the magazine 12 are aligned with, and are mated with the detents 28 and 29. As the detents 28 and 29 are inserted within the notches 30 and 31, a side of the magazine 12 engages the roller 82 to thereby close the switch 80. At this point the motor driving the core 75 of the magazine 12, the projection lamp and associated fans may now be activated. In addition, the magazine 12 could be withdrawn because the stop 76 abuts the knob 56 of the magazine lock 54 to prevent locking of the cam plate 34 in its closed position. Further, the leading edge of the filmstrip 74 is inserted between the pressure roller 66 and the capstan roller 68. When the cam plate 34 is released by the locking plate 46, the finger 72 is withdrawn from the extended portion 63 of the roller bracket 62 thereby bringing the pressure roller 66 into engagement with the filmstrip 74. With the switch 80 actuated and the roller 66 engaging the filmstrip 74, the operator may now withdraw the filmstrip 74 from the magazine 12 and display selected frames of the filmstrip 74 upon a screen (not shown) of the film reader. When any portion of the strip 74 is withdrawn from the magazine 12, the stop 76 will be disengaged from the knob 56, as shown in FIG. 6, and the magazine lock 54 will be biased into a locking position to hold the cam plate 34 and therefore the magazine 12 in the magazine receiving cavity 22. After the information upon the filmstrip 74 has been displayed or otherwise read out, the filmstrip 74 is withdrawn into the magazine 12 to thereby bring the stop 76 into engagement with the knob 56 to thereby release the cam plate 34 (see FIG. 1). The magazine 12 may now be withdrawn from the magazine receiving cavity 22, by pressing the magazine 12 towards the grip rib 88, as shown in FIG. 8. The engagement of the magnetic chuck 86 with the core 75 of the magazine 12 is broken, and the cam plate 34 is disposed in its open position. As the operator withdraws the magazine 12, the locking plate 46 rotates under the action of the biasing spring 52 to engage and therefore lock the cam plate 34 in its open position. The operator is now free to completely withdraw the magazine 12 from the magazine receiving cavity 22.

Thus, there has been shown a mechanical interlocking mechanism which aids the insertion of the magazine into a magazine receiving cavity over appropriate detents and further serves to lock the magazine within the cavity while any portion of the filmstrip stored within the magazine is payed out. The interlock mechanism of this invention is characterized by the positive engagement of its parts to thereby avoid the use of a solenoid and the related power supplies and circuit.

This invention has been described in detail with reference to a preferred embodiment, but it will be understood that variations and modifications can be effected within the spirit and scope of the invention as described hereinabove and as defined by the appended claims.

We claim:

1. In apparatus for use with a magazine having a strip stored therein, which strip has stop means disposed thereon, said apparatus having:
   means for receiving the magazine,
   at least one detent means for locking the magazine within said means for receiving,
   engageable means for withdrawing and returning said strip from and into the magazine, and
   a magazine interlock mechanism,
   the improvement within said magazine interlock mechanism comprising:
   a locking member disposable in a first position to allow the magazine to be inserted within said means for receiving and in a second position wherein said detent means is disposed to secure an inserted magazine within said means for receiving, and
   an interlock member having a first portion for engaging said stop means and a second portion for engaging said locking member, said interlock member being disposable in a first position wherein said first portion abuts said stop means and said second portion is disengaged from said locking member and in a second position wherein said first portion is disengaged from said stop means and said second portion is engaged with said locking member to dispose said locking member in its second position.

2. The combination as claimed in claim 1, wherein said locking member is pivotably mounted so as to be rotatable between its first and second positions.

3. The combination as claimed in claim 2, wherein there is included spring means for biasing said locking member toward its second position.

4. The combination as claimed in claim 1, wherein there is included a second interlock member having a first portion for engaging and locking said locking member in its first position and a second portion against which said magazine abuts to thereby disengage said second interlock member from said locking member, and spring means for directing said second interlock member into engagement with said first mentioned interlock member.

5. The combination as claimed in claim 1, wherein said engageable means includes a roller disposable in a first position for engaging said strip and in a second position withdrawn from said strip, said locking member having a portion interacting with said engageable means to dispose said roller in its first position when said locking member is disposed in its second position and for disposing said roller in its second position when said locking member is disposed in its first position.

6. The combination as claimed in claim 5, wherein said engageable means further includes a capstan roller for imparting a linear motion to said strip and spring means for biasing said pressure roller and said capstan roller together.

7. The combination as claimed in claim 1, wherein said strip has a leading end, said stop means being disposed on the leading end of said strip, and said first portion of said interlock member being engaged with said stop means when said strip is substantially returned to said magazine.

8. The combination as claimed in claim 1, wherein said interlock member is pivotably mounted to move between its first and second positions.

9. The combination as claimed in claim 1, wherein there is further included a switch disposed to be activated when the magazine is fully inserted within said means for receiving to thereby allow said engageable means to withdraw or to return said strip from said magazine.

10. The combination as claimed in claim 1, wherein the magazine includes a core about which said strip is wound, said engageable means including drive means and a member for interconnecting said drive means to said core to impart a rotational motion to said core, a grip disposed adjacent to the entrance to said means for receiving for allowing an operator to grasp the magazine and said grip to thereby disengage said magazine from said member for interconnecting.

11. In a strip feeding apparatus of the type adapted to receive a magazine and feed therefrom a strip having an indication portion, the improvement comprising:
  (a) means associated with said apparatus for receiving the magazine;
  (b) means movable to a first position for retaining an inserted magazine within said apparatus and to a second position for allowing removal of said magazine from said apparatus;
  (c) means for sensing said indicating portion of said strip and moving in response thereto; and
  (d) means operatively associated with said means for retaining and said means for sensing for transmitting movement of said sensing means to control the position of said means for retaining.

12. The invention defined in claim 11, wherein said sensing means is located adjacent said magazine and moves in response to contact with said indicating portion of said strip.

References Cited

UNITED STATES PATENTS

| | | | |
|---|---|---|---|
| 2,912,899 | 11/1959 | Wangerin et al. | 352—72 |
| 2,922,642 | 1/1960 | Cousino | 242—55.19 |
| 3,227,387 | 1/1966 | Laa et al. | 242—198 |

LEONARD D. CHRISTIAN, Primary Examiner

U.S. Cl. X.R.

352—72